United States Patent [19]

Saund et al.

[11] Patent Number: 5,485,565
[45] Date of Patent: Jan. 16, 1996

[54] GESTURAL INDICATORS FOR SELECTING GRAPHIC OBJECTS

[75] Inventors: Eric Saund, San Carlos; Thomas P. Moran; Craig D. Becker, both of Palo Alto, all of Calif.

[73] Assignee: Xerox Corporation, Stamford, Conn.

[21] Appl. No.: 101,645

[22] Filed: Aug. 4, 1993

[51] Int. Cl.[6] .................................................. G06F 15/00
[52] U.S. Cl. ........................................................ 395/142
[58] Field of Search ...................................... 395/133, 155, 395/161, 142, 113, 117, 118, 122

[56] References Cited

PUBLICATIONS

"Symbolic Construction of a 2-D Scale-Space Image," Eric Saund, IEEE Transactions on Pattern Anaysis and Machine Intelligence, Aug. 1990, vol. 12, No. 8.

"Issues in Combining Marking and Direct Manipulation Techniques", Gordon Kurtenbach and William Buxton, Nov. 11–13, UIST 1991, pp. 137–144.

*Primary Examiner*—Phu K. Nguyen
*Attorney, Agent, or Firm*—Rosen, Dainow & Jacobs

[57] ABSTRACT

A graphical imaging system, wherein the rough location, size and shape of objects in the image is summarized by a first characteristic descriptor, representing a parametric "pose" computed for each object. A second characteristic descriptor, i.e. a "gesture matching" function, is provided in order to select the single object, or else the set of objects, that best comports with the user's selection gesture. When most closely matched, these key characteristic descriptors permit simple and natural user gestures to distinguish among a large set of graphic objects that may overlap both spatially. User gestures can be simple slashes passing through the object, or quick, coarse approximations of objects' shapes.

14 Claims, 8 Drawing Sheets

FIG. 1
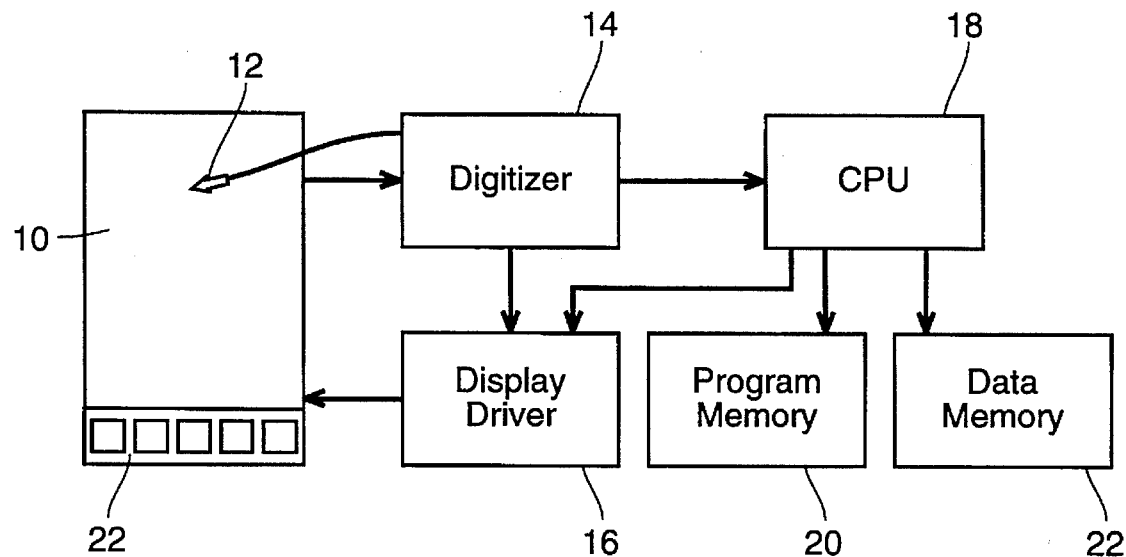
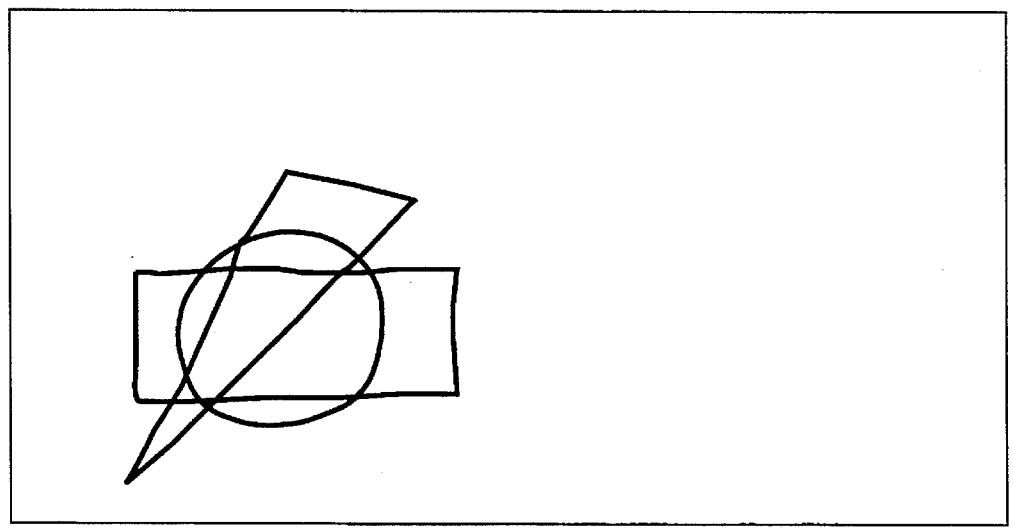
FIG. 3

FIG. 4A
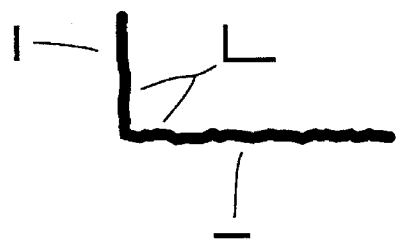
FIG. 4B
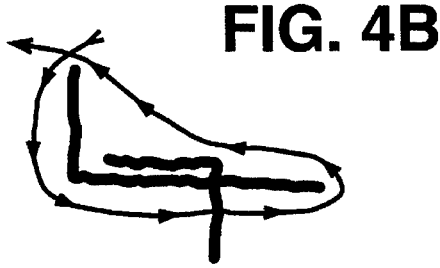
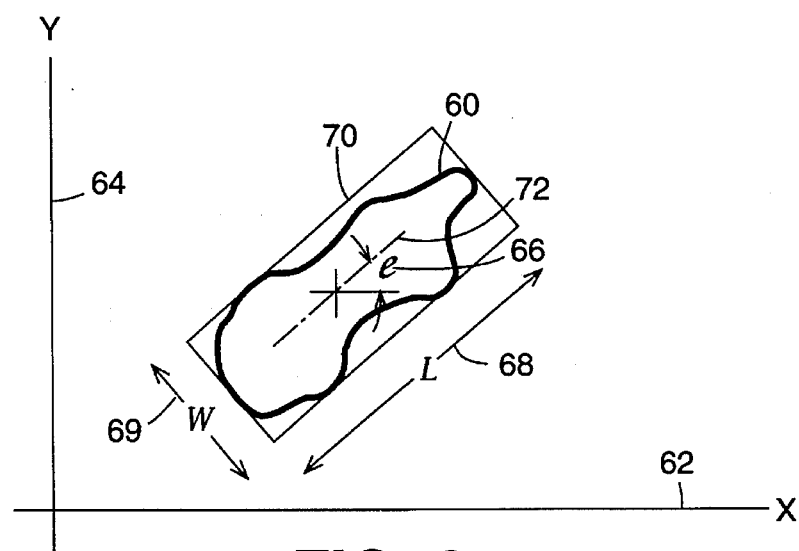
FIG. 6

GESTURAL INDICATORS FOR SELECTING GRAPHIC OBJECTS

RELATED APPLICATIONS

This application is related to Ser. No. 869,554, filed Apr. 15, 1992, Ser. No. 869,559, filed Apr. 15, 1992, and Ser. No. 08/101,646, filed on even date with this application, all assigned to the present assignee, the disclosures of which are, in their entirety, each specifically incorporated by reference herein.

FIELD OF THE INVENTION

This invention pertains to computer programs enabling users to edit images, especially images of text, graphic diagrams, and freehand drawings. Typically, the image being edited is displayed to the user on a computer screen or other imaging device, and the user performs operations by typing strokes at a keyboard and/or by making gestures and pressing buttons using one or more pointing devices such as a mouse or stylus.

BACKGROUND OF THE INVENTION

Among the most important user operations are those enabling the user to select an object or objects in the image to which further operations subsequently will be applied, e.g. move object, delete object, change object size, etc. The object(s) selectable may include any combination of the following: single characters, single words, lines or paragraphs of alpha numeric text such as found in an image of a page of text; graphic symbols, arrowheads, and geometric figures including lines, circles, and rectangles such as found in graphic drawings; and contiguous isolated strokes, stroke fragments bounded by corners, and stroke fragments bounded by junctions such as found in freehand sketches. The issue of determining which visible items in an image may be made available as selectable image objects is the subject of copending application Ser. No. 08/101,646. In that case, a graphic editing application program maintains a set of selectable image objects during the course of an image editing session. This invention relates to enabling the user from time to time to select for further processing one or more of these objects as conveniently as possible.

An important problem faced by any user-interactive image editing tool is therefore the determination of which object or objects in the image are intended by the user to be indicated by a given set of keystroke and/or stylus gesture commands. Keystrokes are capable of specifying symbolic labels or identities unambiguously, but they are an awkward and unnatural interface for the inherently spatial information contained in a displayed image. Conversely, gestures made with a pointing device are convenient for specifying spatial information in the form of locations on an imaging surface, but can lead to ambiguous specification of the object(s) the user intends to select when several objects occupy the same region of the image. Stylus-based selection can be done, for example only, by the following means: (1) having the user touch the stylus or press a mouse button at a single point in the image whereafter the program selects the object or object's whose location parameter lies at or nearest to that point; (2) having the user touch the stylus or press a mouse button at a point in the image whereafter the program selects the object(s) whose spatial extent most nearly approaches the location specified; (3) having the user draw a closed or nearly closed curve whereafter the program either selects all objects sufficiently enclosed by, or else all objects whose location parameters are enclosed by, the closed curve.

The first two methods fail to support user selection of objects in a very important situation, namely, when the set of objects that the user may wish to select among shares overlapping support at the level of marks in the image. Here, the user may wish to select just a vertical line, just a horizontal line, or an entire corner shape. Specifying a single point on one of these lines does not provide sufficient information to distinguish among the alternatives. Moreover, the third method (encircling intended objects) becomes unacceptable when additional objects are found within the region enclosing the desired objects.

SUMMARY OF THE INVENTION

The object of the present invention is to provide a method and apparatus which will interpret users' simple, natural gestures in order to distinguish the object(s) in an image that the user intends to select.

In accordance with the invention, the foregoing object is achieved by the novel union of user interface design technology with concepts from the field of computer vision.

In accordance with one aspect, the invention conjoins two key concepts. First, the rough location, size, and shape of objects in the image is summarized by a first characteristic descriptor, representing a parametric "pose" computed for each object. Next, a second characteristic descriptor, i.e. a "gesture matching" function, is provided in order to select the single object, or else the set of objects, that best comports with the user's selection gesture. When most closely matched, these key characteristic descriptors permit simple and natural user gestures to distinguish among a large set of graphic objects that may overlap both spatially. User gestures can be simple slashes passing through the object, or quick, coarse approximations of objects' shapes.

In accordance with a further aspect of the invention for selecting portions of objects, primitive curve or line segments having no crossings, junctions or sharp corners are approximately linked end to end to define paths. The paths are evaluated to estimate the similarity between them and a selection gesture curve, in order to enable selection of the path that most closely approximates the selection gesture curve.

DESCRIPTION OF THE DRAWINGS

FIG. 1 shows a display editing system in accordance with the invention.

FIG. 3 shows a plurality of overlapping image objects.

FIGS. 4a and b shows a plurality of selectable objects.

FIG. 6 shows the factor used in analyzing an image object.

DETAILED DESCRIPTION OF THE PREFERRED EMBODIMENTS

Figure 2A:
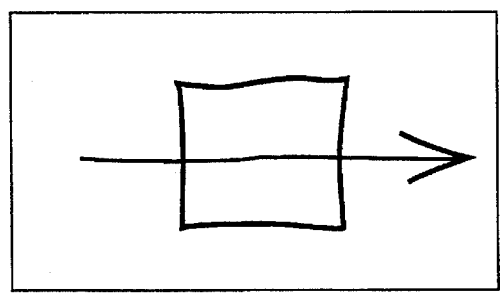
FIGS. 2a–e show a plurality of inputted image objects.
Figure 2B:
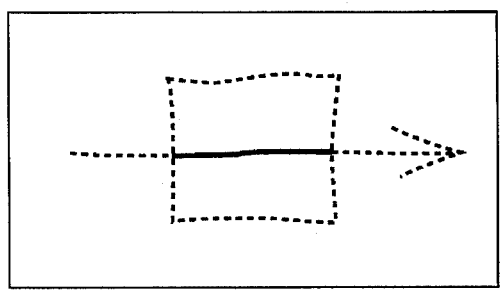
Figure 2C:
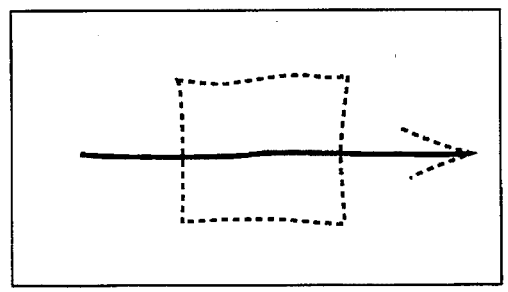
Figure 2D:
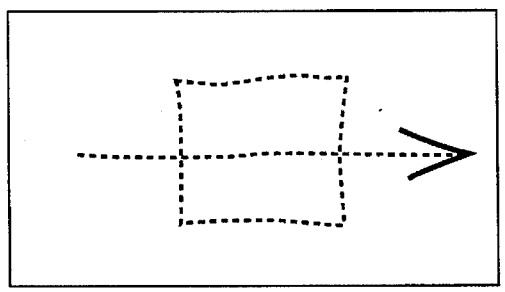
Figure 2E:
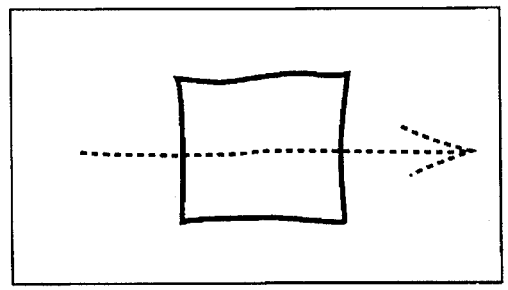

One embodiment of a display editing system which is the subject of the present invention is shown generally in FIG.

1, wherein an input/display component 10 is illustrated, along with a data input device 12. The input/display component is a combination display device as well as an input device. Thus input data entered by the input device 12 is shown on the display as entered. The input device 12 is any form of pointer or pointing device, such as a stylus, mouse, or even the operator's hand, sensed by appropriate proximity or other form of sensing devices. Other forms of input, such as scanned hard copy is also employable. Thus, data inputted by the input device 12 to the screen 10 and displayed on the screen is entered by means of a digitizer 14 which in turn drives a display driver 16 for creating images on the screen in real time as data is entered. The data digitized by the digitizer 14 is conveyed to a CPU 18, wherein it is processed by under control of a program stored in the program memory 20, and the results stored in a data memory 22. The display screen 10 can be employed to perform editing or drafting functions as desired by means of a menu selection 24, through the input device 12, and which is displayed directly on the display screen 10, along area 24.

The foregoing digitizer input and display technique is representative of any of a plurality devices for the input and display of image objects, examples of which are readily apparent in the prior art.

Figure 8:
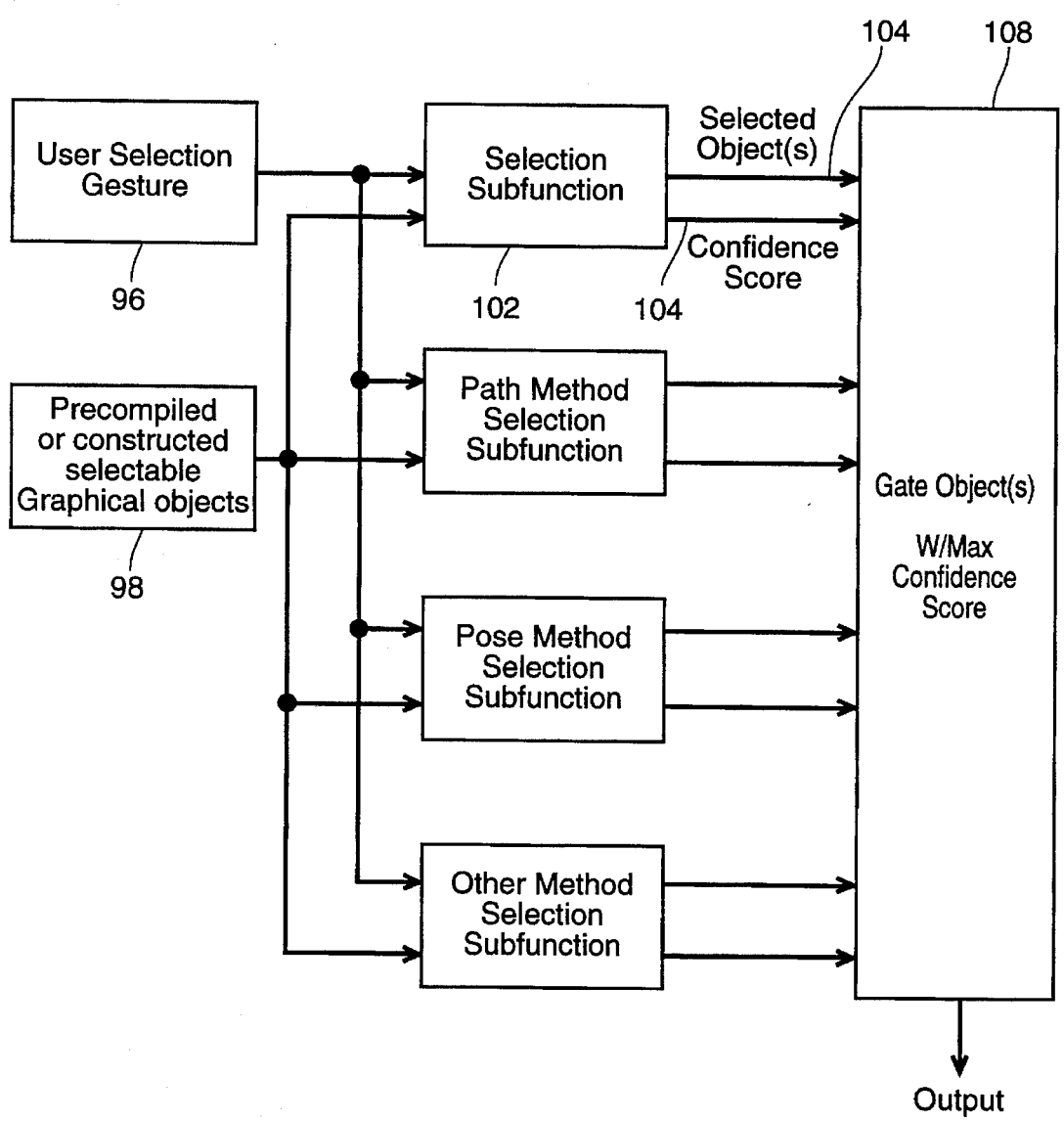
FIG. 8 schematically illustrates the selection function.

FIG. 8 illustrates generally the procedures employed in accordance with the invention to select an image object, i.e. the selecting of an object or objects in an image that are best indicated by a given user-input selection gesture. To accomplish this, an overall gesture matching function, shown in FIG. 8, chooses among the outputs of a cadre of independent subfunctions. Each subfunction provides for a characteristic style or format of user selection gestures. For example, one subfunction may provide for the selection of a set of objects by encircling them, while another may let the user select a single object by drawing a slash through it.

Each subfunction performs object-gesture matching under its own set of matching criteria, and it computes two items. The first item is the single object, or set of objects, that best matches the selection gesture, under that subfunction's criteria. The second item is a subfunction-confidence-score that estimates the "confidence or "likelihood" of this subfunction as the gesture selection format intended by the user. The overall gesture matching function compares subfunction-confidence-scores across gesture matching subfunctions, and returns the object(s) selected by the highest scoring subfunction (as long as this falls above a threshold value). As shown in FIG. 8, user selection gesture 96 and precompiled or currently constructed selectable graphical objects 98 are each processed through a series of selection subfunction operations 102. The output of each selection subfunction is a series of selected objects 104 and the respective confidence score 106 representing each of those objects. In a two step process, described further below, the series of objects scores are then gated in a final analysis 108 to produce the best match of an object for a gesture.

The architecture of this overall gesture matching function permits the present invention to incorporate an extensible set of object selection techniques. The user simply executes a selection gesture and the system infers user intent by comparing subfunction-confidence-scores across the available object selection subfunctions. In order that subfunction-confidence-scores may be compared across subfunctions in a meaningful way, in their design they must be calibrated to a common standard. Under a preferred standard, each score ranges between 0 and 1, where 0 indicates that subfunction has no confidence that the object(s) it returns corresponds to the user's intent, while 1 indicates absolute certainty. For example, an extremely simple measure of confidence score for an "encircling" gesture may be expressed as one minus the weighted ratio of the distance between the curve's endpoints and the curve's length.

Two selection subfunctions are disclosed herein that may be used as selection subfunctions 102 to produce selected objects 104 in the above architecture. It is apparent, however, that the invention is not limited to these two embodiments. First, a "pose-matching" routine results in a selection of a single object that is most similar to (least different from) the location, orientation, size, and shape of the user selection gesture. This routine is especially useful for singling out objects found in close or overlapping proximity to many other spurious objects. Second, a "path-matching" routine selects and computes a set of objects in the image that best corresponds to the path of a selection gesture. This routine is especially useful for quickly selecting several objects lying along a curvilinear path. It is of course apparent that other techniques may alternatively be employed.

Pose Matching Selection

FIG. 2*a–e*, illustrates one aspect of the invention, wherein FIG. 2*a* is a free hand example of a line drawing graphic image or a structural graphic image. FIGS. 2*b–e* each show objects, as indicated by the solid lines, that a user might wish to select from the image.

Referring to FIG. 3, a plurality of overlapping image objects drawn on a display screen is illustrated. Object selection by conventional spatial location fails when the objects lie in roughly the same location on the imaging surface, as do the rectangle, circle and triangle in this figure.

Referring to FIGS. 4*a* and 4*b*, selection by pointing to a point on an object fails when objects share support. Thus, in FIG. 4*a*, three selectable objects are constructed from two line segments. Conventional selection of the horizontal segment does not distinguish between selection of only the horizontal segment versus selection of the "L". In FIG. 4*b*, conventional encircling gestures fail when spurious objects fall within the region enclosed by the target selected objects.

Figure 5A:
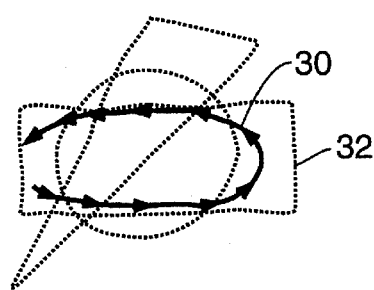
FIGS. 5a–f shows the relationship between gesture and object.
Figure 5B:
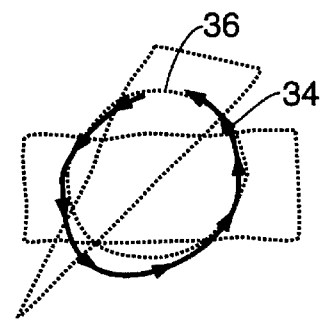
Figure 5C:
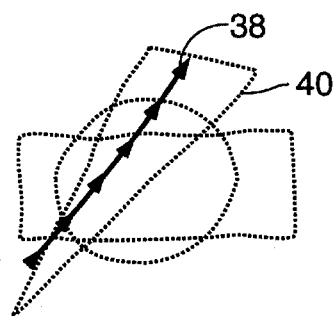
Figure 5D:
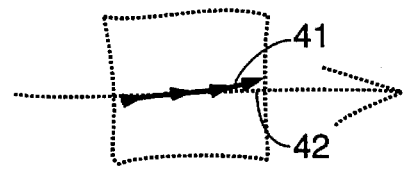
Figure 5E:
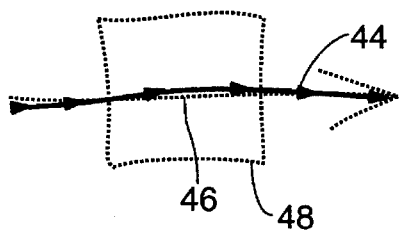
Figure 5F:
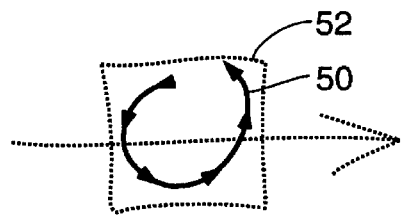

With respect to FIGS. 5*a–f,* selection of one of a plurality of overlapping image objects, in accordance with the invention, is made by appropriately coupling a gesture to an object. Thus, in FIG. 5*a*, the object selected by gesture 30 is the rectangular object 32. In FIG. 5*b*, circle gesture 34 selects the circular object 36. In FIG. 5*c*, the line gesture 38 selects the triangular object 40. In FIG. 5*d,* gesture 41 selects the short line segment 42. In FIG. 5*e,* gesture 44 selects the long line segment 46 passing through the box 48. In FIG. 5*f,* the circle gesture 50 selects the box 52. Note than in FIG. 5*c,* the gesture 38 need not even closely resemble the object selected, but is just a shorthand indication of location, orientation and size of the target object. Similarly, a horizontal gesture could be used to select the rectangle in FIG. 5*a.*

For a typical graphic object, and for the shape of a selection gesture made with a pointing device, referring to FIG. 6, an effective parametric description of the pose, that is, the object or gesture's 60 rough location, orientation, size, and shape, consists of the following five parameters: the x-location (x) on the abscissa 62, y-location (y) on the ordinate 64, orientation ($\theta$) 66, scale factors, such as length 68 and or width 69, and aspect ratio (r) parameters of an oriented bounding box 70 associated with the object (with respect to a fixed global coordinate system).

Figure 7:
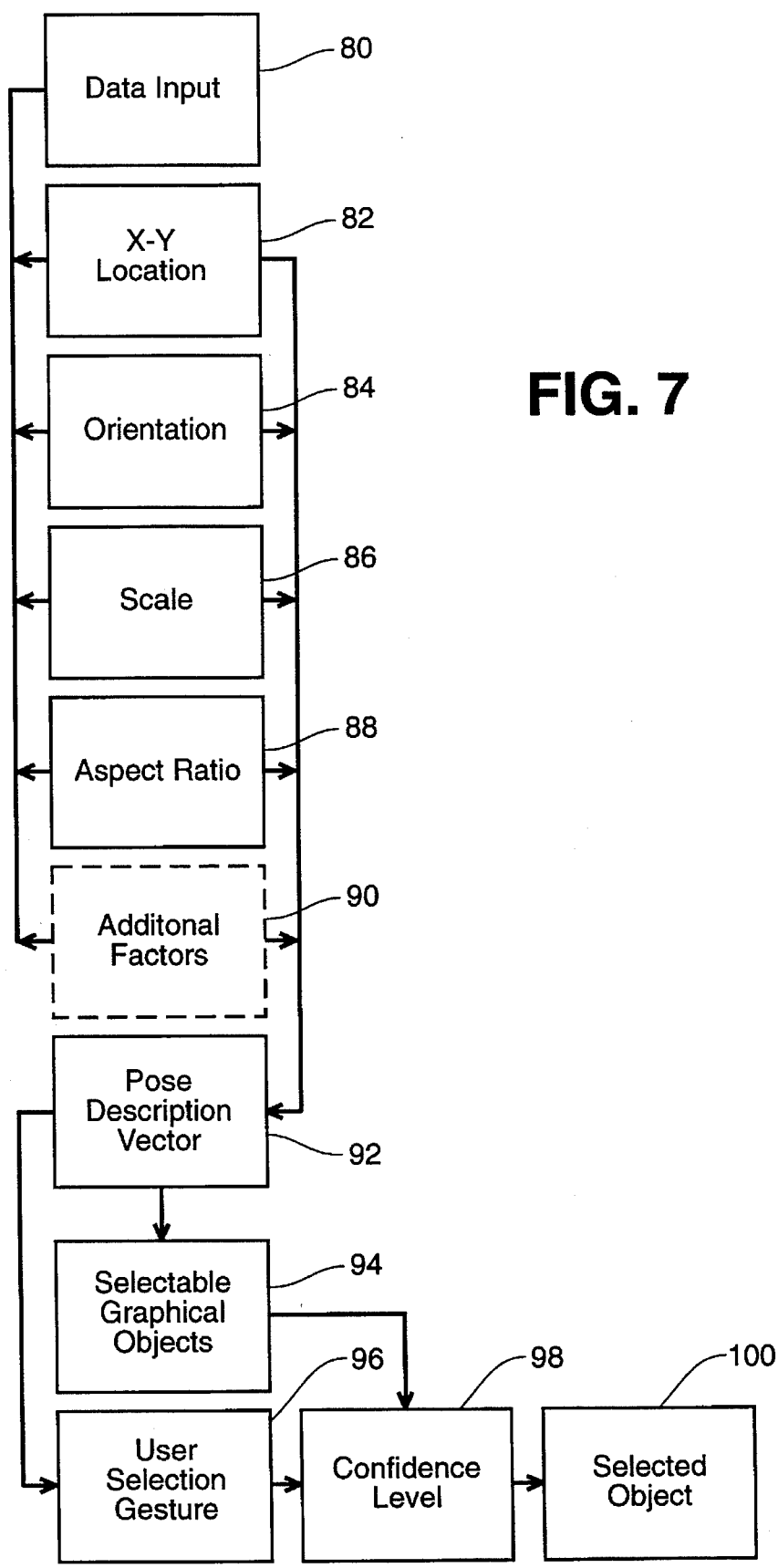
FIG. 7 is a flow chart illustrating the pose description vector of an object on gesture.

The x-y location may be computed as the centroid of the ON pixels of the object. The orientation parameter may be taken as the orientation of the principle axis of inertia through the centroid. The scale parameter may be computed as a linear function of the logarithm of the length of the object (linear extent along the principle axis of inertia). The aspect ratio may be taken as the maximum of a fixed minimum value and the ratio of the object's width (linear extent along the axis perpendicular to the principle axis of inertia) and length. The pose description vector is extensible and may be imbued with more parameters than the five named above in order to provide more distinguishing information. As shown in FIG. 7, the data input 80 is employed to derive x-y location 82, orientation 84, aspect ratio 88, and any additional parameters 90 to define a pose description vector 92 which is a characteristic description representative of an object or gesture. For example, additional parameters could include higher order geometric moments, angular closure, and contour texture measures. The pose description vector defines, for each image object, a first characteristic descriptor, stored in location 94. It also defines, for each user selection gesture, a second characteristic descriptor, stored in a location 96. A comparison and analysis function 98 is then performed between the defined graphical objects and the user selection gesture to determine a confidence level for determining that object which best meets the user selection gesture. The resultant selected object 100 is then defined. The confidence level and selection process is described in more detail in connection with FIG. 8.

2.1 Pose-Matching Routine

The pose-matching routine (FIG. 9) for assessing the similarity/difference of two poses must take account of the relative significance of the location, orientation, scale, and aspect ratio parameters jointly in a highly nonlinear fashion; a simple Euclidian distance measure is inappropriate. For example, the difference in the orientation parameters of poses is significant when the aspect ratio of both objects is relatively high (near 0) but becomes insignificant when either object displays low aspect ratio (near 1). For the purposes of the present implementation of the invention, the following is the formula for the pose difference D between two poses, $P_1 \equiv \{x_1, y_1, \theta_1, s_1, r_1\}$ and $P_2 \equiv \{x_2, y_2, \theta_2, s_2, r_2\}$:
$D = 1 - (1 - f_1\rho_1)(1 - f_2\rho_1)(1 - f_r)(1 - f_\theta)(1 - f_s)$
where $$f_1 = \frac{f_{1\alpha}}{1 + f_{1\alpha}}$$

$$f_{1\alpha} = \frac{\rho_2 d e^{-\rho_3 s_1}}{1 - (1 - r_1)|\sin \alpha_1|}$$

$\alpha_1 = \gamma - \theta_1$ $$f_2 = \frac{f_{2\alpha}}{1 + f_{2\alpha}}$$

$$f_{2\alpha} = \frac{\rho_2 d e^{-\rho_3 s_2}}{1 - (1 - r_2)|\sin \alpha_2|}$$

$\alpha_2 = \gamma - \theta_2$
$d = [(x_1 - x_2)^2 + (y_1 - y_2)^2]^{1/2}$
$\gamma = \tan^{-1}(y_2 - y_1, x_2 - x_1)$
$f_r = |r_1 - r_2|$ $$f_\theta = \frac{2}{\pi} |\theta_2 - \theta_1|(1 - \max(r_1, r_2))$$

$$f_s = \frac{f_{s\alpha}}{1 + f_{s\alpha}}$$

$f_{s\alpha} = |s_1 - s_2|$

The constant parameters are assigned the following values:

$\rho_1 = 0.75; \rho_2 = 0.2; \rho_3 = 0.693$.

The difference formula is incorporated in the pose-matching routine by prescreening candidate objects on the basis of spatial location using a spatially- and scale-indexed data structure which is described in the aforementioned copending application Ser. No. 08/101,646. The pose difference between the selection gesture and each of these preselected objects is computed in turn, and the object with the least difference is returned. Since the pose match distance D above ranges from 0 (perfect match) to 1 (no match), the subfunction-confidence-score may be taken simply as 1−D.

Figure 9:
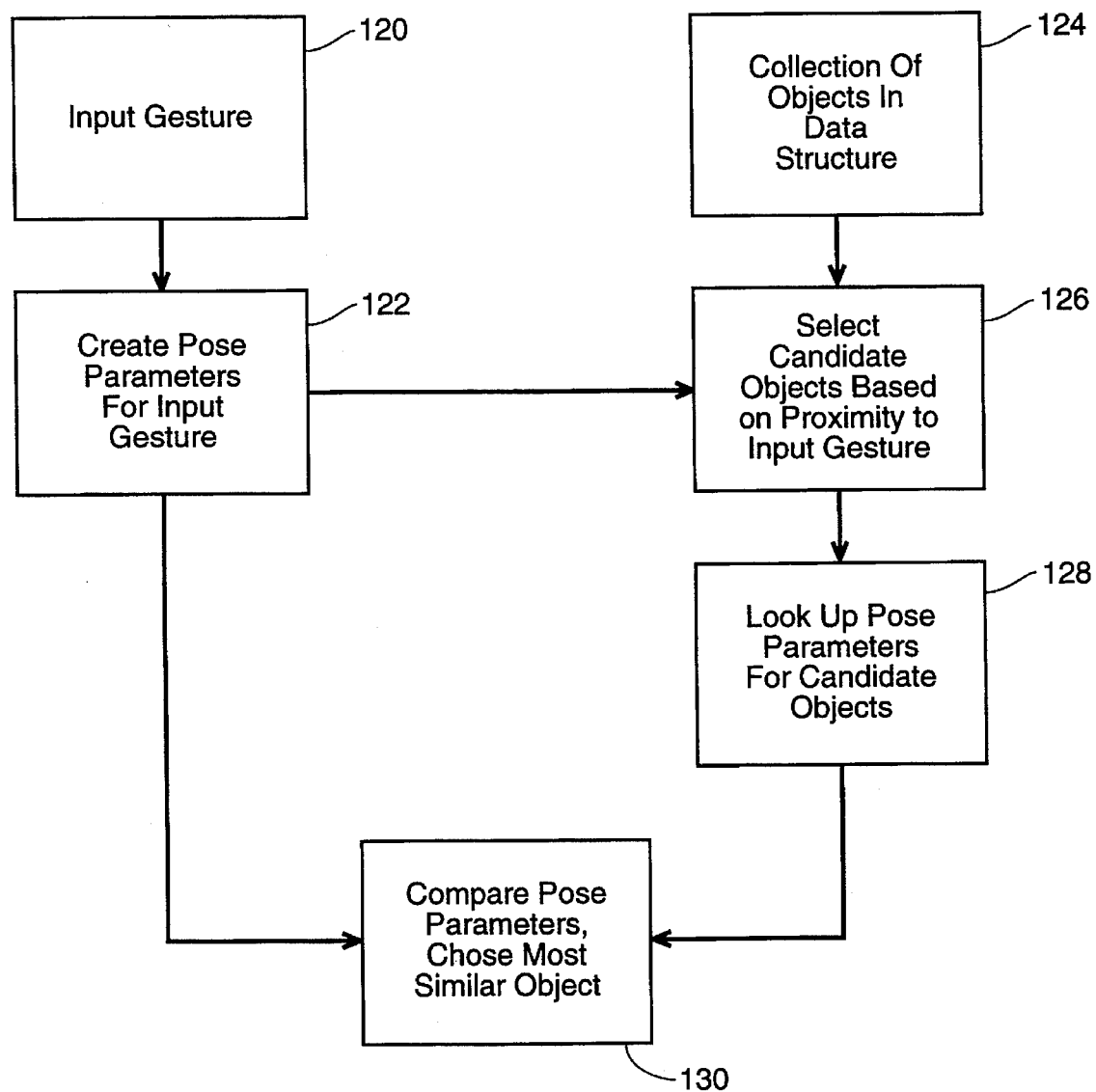
FIG. 9 is an overall flow chart of the selection routine.

The overall matching operation as described in FIG. 9, first shows an input gesture applied to the system, block 120. Next, the system creates pose parameters for the input gesture, block 122. Then, from a collection of objects stored in a data structure, block 124, candidate objects are selected based on proximity to the input gesture, block 126. Next, the system does a lookup for pose parameters for candidate objects, block 128. The system then compares the sets of pose parameters for the input gesture with those of candidate objects, block 130, and chooses the most similar object.

Path Matching Selection

Figure 10:
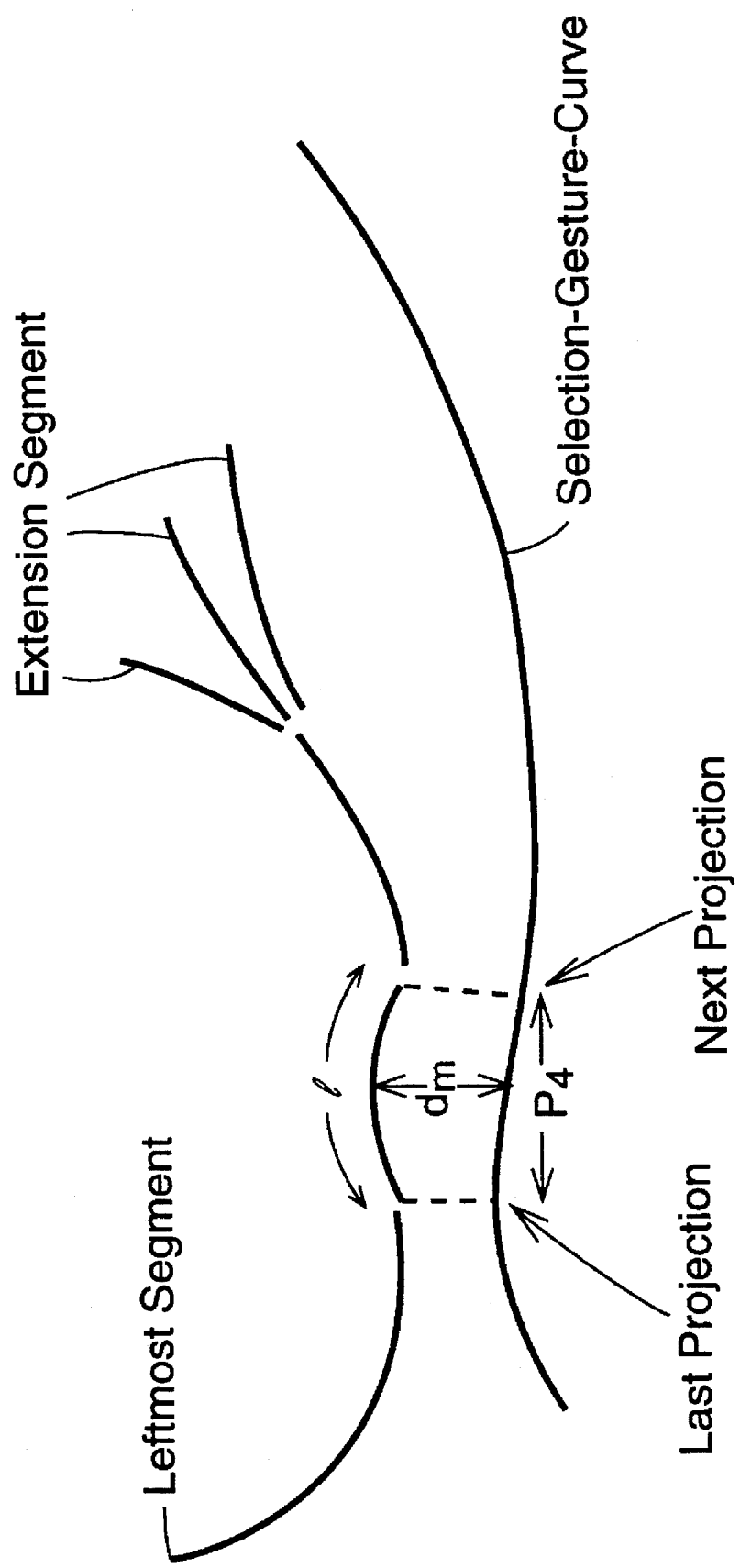
FIG. 10 illustrates an aspect of selection according to the invention.

To effect the path matching operation as shown in FIG. 9, this invention provides a path-matching selection subfunction which collects a set of image objects that best accounts for the path of the selection-gesture-curve. For this subfunction, first define a path to be a sequence of primitive curve segments (curve segments containing no crossings, junctions, or sharp corners) approximately linked end-to-end. Next, define a path-quality measure that estimates the similarity between a path and a selection-gesture-curve. In more detail, the path-quality measure for any path is computed by a set of steps in a routine as follows:

1. Begin with the curve-segment deemed to be the beginning of the path sequence. Call this the "leftmost" segment. Project the "leftmost" end of this segment onto the selection-gesture-curve, as shown in FIG. 10.

1a. Initialize the variable, current-segment to be the leftmost segment.

1b. Initialize the variable, last-projection-proportion to be the proportion of the selection-gesture-curve to the left of the projection point.

1c. Initialize the variable, best-possible-score $s_b$ to be the proportion of the selection-gesture-curve to the right of the projection point.

1d. Initialize the variable, actual-score, $s_a$ to o.

2. Compute a variable called fit-quality-factor, $fq$ for the current-segment, as follows, $$fq = 1 - \max\left(0, \left(\min, 1\left(\frac{\rho_4 d_m}{l}\right)\right)\right)$$

where $\rho_4$ is a tunable parameter for which a value of 0.5 is satisfactory, $d_m$ is the maximum distance between a point on the current-segment and the selection-gesture-curve, and l is the length of the current-segment.

3. Set the variable, next-projection-proportion, $p_n$ to be the proportion of the selection-gesture-curve to the left of the projection of the "right" end of the current-segment onto the selection-gesture-curve.

4. Set a variable called this-segment-selection-curve-array-fraction, $f_r$ to be the difference between the next-projection-proportion and the last-projection-proportion.

5. Set a variable called this-segment-projection-length, $p_1$ to be the curve distance along the selection-gesture-curve between the projections of the left and right ends of the current-segment.

6. Set a variable called excess-segment-length-cost, $c_{el}$ to be the value, $$c_{el} = \frac{\max(0, |l - p_l| - p_5 l)}{l}$$

where $p_5$ is a tunable parameter for which the value .25 is satisfactory.

7. Update the variable actual-score $$s_a = s_a + f_q f_r - c_{el}$$

8. Update the variable, best-possible-score:

$$s_b = s_a + 1 - p_n$$

9. Set the leftmost-segment to be the next segment in the path sequence, and to proceed to step 2.

For the main body of the algorithm, maintain a data structure called the path-list consisting of a list of paths along with their actual scores $s_a$, and their best-possible-scores, $s_b$. The basic search algorithm proceeds as follows.

1. Initialize the path-list with the set of curve-segments possessing an endpoint lying within a threshold distance of the "leftmost" endpoint of the selection-gesture-path.
2. Initialize the variable current-actual-score $S_a$ to be the maximum actual score $s_a$ over the paths in path-list.
3. Initialize the variable current-best-possible-score $S_b$ to be the maximum best-possible-score $s_b$ over the paths in the path-list.
4. Set the variable, best-possible-path to be the path in path-list having the greatest best-possible-score.
5. Perform an expansion operation on the best-possible-path. This consists of extending the path with all curve-segments one of whose endpoints falls within a threshold distance of the rightmost end of the rightmost segment in the path. The result of this operation is a list of new paths, one for each such extension segment found. Call this result, current-expanded-path-list.
6. Compare each path in path-list with each path in current-expanded-path-list, and remove any path whose rightmost curve-segment is the same as the rightmost curve-segment of any other path which contains fewer curve-segments.
7. Update the variable, path-list, to be the union of path-list and expanded-path-list.
8. Examine each path in path-list. Update the variable current-acutal-score, $S_a$, to be the best-actual-score among these, and set the variable, best-actual-path to be the corresponding path.
9. Eliminate from path-list any path whose best-possible score $s_b$ is less then the current-actual-score $S_a$.
10. Eliminate from path-list any path which has already been expanded and for which its actual-score $s_a$ falls below the current-actual-score $S_a$.
11. If ony one path remains, output it as the best fitting path and output its actual score $s_a$ as the confidence value. If more than one path remains, proceed to step 5.

Certain changes and modifications of the embodiment of the invention herein disclosed will be readily apparent to those of average skill in the art. Moreover, uses of the invention other than for coordinate determination in a digitizer system will also be readily apparent to those of skill in the art. It is the applicants' intention to cover by the claims all such uses and all those changes and modifications which could be made to the embodiments of the invention herein chosen for the purposes of disclosure which do not depart from the spirit and scope of the invention.

What is claimed is:

1. A display editing system for selecting one image object from a plurality of image objects for editing, comprising first means for entering a plurality of image objects on a display surface, second means responsive to each entered object for creating and storing a first characteristic descriptor representative of said object, said first characteristic descriptor including the general shape and location on the display surface of said object, third means for entering a selection gesture for selecting at least one of said objects, fourth means responsive to said selection gesture for creating and storing a second characteristic descriptor representative of said selection gesture, said second characteristic descriptor including the general shape and location on the display surface of said selection gesture, fifth means for choosing the one of said first characteristic descriptors which is most similar in general shape and location to that of said second characteristic descriptor, thereby selecting said one image object.

2. A display editing system for selecting one image object from a plurality of image objects for editing, comprising first means for entering a plurality of overlapping objects on a display surface, second means responsive to each object for creating and storing a first characteristic descriptor representative of each of said objects, said first characteristic descriptor including the general shape and location on the display surface of said object, third means for entering a selection gesture for selecting one of said objects from said overlapping objects, fourth means responsive to said selection gesture for creating and storing a second characteristic descriptor representative of said selection gesture, said second characteristic descriptor including the general shape and location on the display surface of said selection gesture, fifth means for choosing the one of said first characteristic descriptors which is most similar in general shape and location to that of said second characteristic descriptor, and thereby selecting said one image object.

3. The system of claim 2, wherein said second means includes means with respect to a fixed location on said display surface for determining the X-Y location of said object, for determining the orientation of said object, for determining a function of the length of said object, and for determining the aspect ratio of said object, and means for generating, from said foregoing determinations, said first characteristic descriptor.

4. The system of claim 3 wherein said fourth means, with respect to a fixed location on said display surface for determining the X-Y location of said gesture, for determining the orientation of said gesture, for determining the function of the length of said gesture, and for determining the aspect ratio of said gesture, and means for generating, from said foregoing determinations, said second characteristic descriptor.

5. The system of claim 2, wherein said fifth means includes means for calculating a difference factor between each said first characteristic descriptor and that of said gesture, and means for selecting that one of said first characteristic descriptors which represents the least difference factor between said one first characteristic descriptor and that of said gesture.

6. A method of display editing for selecting one image object from a plurality of image objects for editing, comprising the steps of entering a plurality of overlapping objects on a display surface, creating and storing a first characteristic descriptor representative of said object, said first characteristic descriptor including the general shape and location on the display surface of said object, entering a selection gesture for selecting one of said objects, creating and storing a second characteristic descriptor representative of said selection gesture, said second characteristic descriptor including the general shape and location on the display surface of said selection gesture, choosing the one of said first characteristic descriptors which is most similar in general shape and location to that of said second characteristic descriptor, and thereby selecting one image object from said plurality of overlapping objects.

7. The method of claim 6, wherein creating said first characteristic descriptor include, with respect to a fixed location on the display surface, determining the X-Y location of said object, determining the orientation of said object, determining a function of the length of said object, determining the aspect ratio of said object, and generating, from said foregoing determinations, said first characteristic descriptor.

8. The method of claim 7 wherein creating said second characteristic descriptor includes, with respect to a fixed location on the display surface, determining the X-Y location of said gesture, determining the orientation of said gesture, determining the function of the length of said gesture, determining the aspect ratio of said gesture, and generating, from said foregoing determinations, said second characteristic descriptor.

9. The method of claim 6 wherein choosing the one of said first characteristic descriptors includes calculating a difference factor between each said first characteristic descriptor and that of said gesture, and selecting that one of said first characteristic descriptors which represents the least difference factor between said one first characteristic descriptor and that of said gesture.

10. A display editing system for selecting a path formed of a collection of primitive objects suitably related to each other of an image, from a plurality of paths formed of line segments, comprising:

first means for entering said plurality of primitive objects on a display surface, second means for entering a selection gesture curve, third means for generating a path list corresponding to a plurality of incomplete paths representing a sequence of primitive objects;

fourth means responsive to entry of said selection gesture curve for comparing the general shape and location of said entered selection gesture curve with partial curves of said path list, fifth means for choosing one of said paths which is most similar in general shape and location to that of said entered selection gesture curve.

11. A display editing system for selecting a chain of objects from a plurality of objects displayed on a display screen wherein the objects are represented by a path formed of a sequence of primitive line segments approximately linked together, said primitive line segments each having no crossing, junctions or sharp corners, comprising:

first means for entering said plurality of primitive line segments for each of said objects on a display surface, second means for entering a selection gesture curve, third means for generating a path list corresponding to a plurality of incomplete paths representing a sequence of the primitive line segments representative of said plurality of objects;

fourth means responsive to entry of said selection gesture curve for comparing said entered selection gesture curve with partial curves of said path list, fifth means for choosing one of said paths from said path list which is most similar to said entered selection gesture curve to thereby select the chain of objects represented by said path.

12. The combination of claim 11, wherein said fifth means includes means for adding chosen paths from the list of paths until the final line of paths represents the best of all chosen paths.

13. A method of selecting a graphical object most closely related to a selection gesture, comprising the steps of inputting a selection gesture; creating a characteristic descriptor representative of the general shape and location for said input gesture; providing a plurality of gesture-based selection modes; testing the characteristic descriptor of the input gesture for a similarity to a property of each graphical object by each of the gesture-based selection modes using the corresponding property of the selection mode; assigning a score to each object or set of objects based on the said testing; and selecting the object or set of objects with the highest score.

14. The method of claim 13, wherein the testing step includes assignment thereto of a confidence score, and further including the step of gating each selected object with a confidence score and selecting that object with the highest confidence score.

* * * * *